United States Patent
Wray et al.

(10) Patent No.: US 11,874,120 B2
(45) Date of Patent: Jan. 16, 2024

(54) SHARED AUTONOMOUS VEHICLE OPERATIONAL MANAGEMENT

(71) Applicants: Nissan North America, Inc., Franklin, TN (US); The University of Massachusetts, Boston, MA (US)

(72) Inventors: Kyle Hollins Wray, Amhurst, MA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 330 days.

(21) Appl. No.: 16/955,531

(22) PCT Filed: Dec. 22, 2017

(86) PCT No.: PCT/US2017/068242
§ 371 (c)(1),
(2) Date: Jun. 18, 2020

(87) PCT Pub. No.: WO2020/204871
PCT Pub. Date: Oct. 8, 2020

(65) Prior Publication Data
US 2021/0078602 A1    Mar. 18, 2021

(51) Int. Cl.
*G01C 21/34*    (2006.01)
*B60W 60/00*    (2020.01)
*H04L 9/40*    (2022.01)

(52) U.S. Cl.
CPC ....... *G01C 21/3407* (2013.01); *B60W 60/001* (2020.02); *H04L 63/1425* (2013.01); *H04L 63/20* (2013.01); *B60W 2556/45* (2020.02)

(58) Field of Classification Search
CPC ........... B60W 60/001; B60W 2556/45; B60W 2552/00; B60W 2552/50; B60W 2556/50;
(Continued)

(56) References Cited

U.S. PATENT DOCUMENTS

| 4,751,570 A | 6/1988 | Robinson |
| 5,615,116 A | 3/1997 | Gudat et al. |

(Continued)

FOREIGN PATENT DOCUMENTS

| CN | 103945486 A | 7/2014 |
| CN | 105620470 A | 6/2016 |

(Continued)

OTHER PUBLICATIONS

WO-2020075961-A1 Translation (Year: 2020).*

(Continued)

*Primary Examiner* — Jeff A Burke
*Assistant Examiner* — Kyle T Johnson
(74) *Attorney, Agent, or Firm* — Young Basile Hanlon & MacFarlane, P.C.

(57) ABSTRACT

Traversing, by an autonomous vehicle, a vehicle transportation network, may include identifying a distinct vehicle operational scenario, wherein traversing the vehicle transportation network includes traversing a portion of the vehicle transportation network that includes the distinct vehicle operational scenario, communicating shared scenario-specific operational control management data associated with the distinct vehicle operational scenario with an external shared scenario-specific operational control management system, operating a scenario-specific operational control evaluation module instance including an instance of a scenario-specific operational control evaluation model of the distinct vehicle operational scenario, and wherein operating the scenario-specific operational control evaluation (Continued)

module instance includes identifying a policy for the scenario-specific operational control evaluation model, receiving a candidate vehicle control action from the policy for the scenario-specific operational control evaluation model, and traversing a portion of the vehicle transportation network based on the candidate vehicle control action.

15 Claims, 6 Drawing Sheets

(58) Field of Classification Search
CPC .......... B60W 60/0011; G01C 21/3407; H04L 63/1425; H04L 63/20
See application file for complete search history.

(56) References Cited

U.S. PATENT DOCUMENTS

| | | | |
|---|---|---|---|
| 6,076,034 A * | 6/2000 | Satoh | B60K 31/0058 701/431 |
| 8,762,006 B2 | 6/2014 | Miller | |
| 8,781,669 B1 | 7/2014 | Teller et al. | |
| 8,849,483 B2 | 9/2014 | Kuwata et al. | |
| 8,884,782 B2 | 11/2014 | Rubin et al. | |
| 9,081,651 B2 | 7/2015 | Filev et al. | |
| 9,103,671 B1 | 8/2015 | Breed et al. | |
| 9,134,731 B2 * | 9/2015 | Healey | G01C 21/28 |
| 9,494,439 B1 | 11/2016 | Ross et al. | |
| 9,568,915 B1 | 2/2017 | Berntorp et al. | |
| 9,646,428 B1 | 5/2017 | Konrardy et al. | |
| 9,972,054 B1 | 5/2018 | Konrardy et al. | |
| 10,029,701 B2 | 7/2018 | Gordon et al. | |
| 10,061,326 B2 | 8/2018 | Gordon et al. | |
| 10,093,322 B2 | 10/2018 | Gordon et al. | |
| 10,126,135 B2 | 11/2018 | Mortazavi et al. | |
| 10,185,998 B1 | 1/2019 | Konrardy et al. | |
| 10,254,759 B1 | 4/2019 | Faust et al. | |
| 10,319,039 B1 | 6/2019 | Konrardy et al. | |
| 10,371,130 B2 | 8/2019 | Deng et al. | |
| 10,380,886 B2 | 8/2019 | Ran et al. | |
| 10,408,638 B2 | 9/2019 | Berntorp et al. | |
| 10,514,705 B2 | 12/2019 | Shalev-Shwartz et al. | |
| 10,518,764 B2 | 12/2019 | Cao et al. | |
| 10,538,252 B2 | 1/2020 | Ebina et al. | |
| 10,543,828 B2 | 1/2020 | Stayton et al. | |
| 10,599,155 B1 | 3/2020 | Konrardy et al. | |
| 10,885,432 B1 | 1/2021 | Dulac-Arnold et al. | |
| 10,990,096 B2 | 4/2021 | Isele et al. | |
| 11,037,320 B1 | 6/2021 | Ebrahimi Afrouzi et al. | |
| 11,635,758 B2 | 4/2023 | Wray et al. | |
| 2004/0068351 A1 | 4/2004 | Solomon | |
| 2005/0057370 A1 | 3/2005 | Warrior et al. | |
| 2007/0021915 A1 | 1/2007 | Breed et al. | |
| 2007/0168096 A1 | 7/2007 | Boutin | |
| 2008/0097699 A1 | 4/2008 | Ono | |
| 2009/0088916 A1 | 4/2009 | Elgersma et al. | |
| 2009/0140887 A1 | 6/2009 | Breed et al. | |
| 2009/0299496 A1 | 12/2009 | Cade | |
| 2009/0326819 A1 | 12/2009 | Taguchi | |
| 2010/0223216 A1 | 9/2010 | Eggert et al. | |
| 2011/0016067 A1 | 1/2011 | Levchuk et al. | |
| 2011/0102195 A1 | 5/2011 | Kushi et al. | |
| 2012/0150437 A1 | 6/2012 | Zeng et al. | |
| 2012/0233102 A1 | 9/2012 | James | |
| 2012/0290152 A1 | 11/2012 | Cheung et al. | |
| 2013/0318023 A1 | 11/2013 | Morimura et al. | |
| 2014/0067483 A1 | 3/2014 | Jeong et al. | |
| 2014/0136414 A1 | 5/2014 | Abhyanker | |
| 2014/0201838 A1 * | 7/2014 | Varsanyi | H04L 63/1425 726/23 |
| 2014/0222277 A1 | 8/2014 | Tsimhoni et al. | |
| 2014/0244114 A1 | 8/2014 | Matsubara | |
| 2014/0309838 A1 | 10/2014 | Ricci | |
| 2015/0039157 A1 | 2/2015 | Wolfe et al. | |
| 2015/0070156 A1 | 3/2015 | Milburn, Jr. | |
| 2015/0081156 A1 | 3/2015 | Trepagnier et al. | |
| 2015/0105961 A1 | 4/2015 | Callow | |
| 2015/0106010 A1 | 4/2015 | Martin et al. | |
| 2015/0153735 A1 | 6/2015 | Clarke et al. | |
| 2015/0183431 A1 | 7/2015 | Nanami | |
| 2015/0210274 A1 | 7/2015 | Clarke et al. | |
| 2015/0253772 A1 | 9/2015 | Solyom et al. | |
| 2015/0329130 A1 | 11/2015 | Carlson et al. | |
| 2015/0345966 A1 | 12/2015 | Meuleau | |
| 2015/0345967 A1 | 12/2015 | Meuleau | |
| 2015/0370228 A1 | 12/2015 | Kohn et al. | |
| 2015/0375748 A1 | 12/2015 | Nagase et al. | |
| 2016/0068158 A1 | 3/2016 | Elwart et al. | |
| 2016/0129907 A1 | 5/2016 | Kim et al. | |
| 2016/0161270 A1 | 6/2016 | Okumura | |
| 2016/0209842 A1 | 7/2016 | Thakur et al. | |
| 2016/0209843 A1 | 7/2016 | Meuleau et al. | |
| 2016/0209848 A1 | 7/2016 | Kojo et al. | |
| 2016/0260328 A1 | 9/2016 | Mishra et al. | |
| 2016/0318511 A1 | 11/2016 | Rangwala | |
| 2016/0318515 A1 | 11/2016 | Laur et al. | |
| 2016/0327953 A1 | 11/2016 | Nilsson et al. | |
| 2016/0334230 A1 | 11/2016 | Ross et al. | |
| 2016/0334797 A1 | 11/2016 | Ross et al. | |
| 2016/0335892 A1 | 11/2016 | Okada et al. | |
| 2016/0339919 A1 | 11/2016 | Habu et al. | |
| 2016/0375766 A1 | 12/2016 | Konet et al. | |
| 2016/0375768 A1 | 12/2016 | Konet et al. | |
| 2017/0008168 A1 | 1/2017 | Weng et al. | |
| 2017/0010108 A1 | 1/2017 | Shashua | |
| 2017/0010617 A1 | 1/2017 | Shashua et al. | |
| 2017/0031361 A1 | 2/2017 | Olson et al. | |
| 2017/0032590 A1 | 2/2017 | Stefan et al. | |
| 2017/0038777 A1 | 2/2017 | Harvey | |
| 2017/0090478 A1 | 3/2017 | Blayvas et al. | |
| 2017/0090480 A1 | 3/2017 | Ho et al. | |
| 2017/0102700 A1 | 4/2017 | Kozak | |
| 2017/0124476 A1 * | 5/2017 | Levinson | G06V 20/58 |
| 2017/0137025 A1 | 5/2017 | Muto et al. | |
| 2017/0158193 A1 | 6/2017 | Lopez et al. | |
| 2017/0215045 A1 * | 7/2017 | Rasal | G01S 19/48 |
| 2017/0225760 A1 | 8/2017 | Sidki et al. | |
| 2017/0228662 A1 | 8/2017 | Gu et al. | |
| 2017/0236422 A1 | 8/2017 | Naka et al. | |
| 2017/0261325 A1 | 9/2017 | Schroeder et al. | |
| 2017/0262790 A1 | 9/2017 | Khasis | |
| 2017/0276780 A1 | 9/2017 | Takehara et al. | |
| 2017/0277193 A1 * | 9/2017 | Frazzoli | B60W 60/0011 |
| 2017/0291539 A1 | 10/2017 | Avery | |
| 2017/0297576 A1 | 10/2017 | Halder et al. | |
| 2017/0329338 A1 | 11/2017 | Wei et al. | |
| 2017/0334451 A1 | 11/2017 | Asakura et al. | |
| 2017/0356746 A1 | 12/2017 | Iagnemma | |
| 2017/0357263 A1 | 12/2017 | Glatfelter et al. | |
| 2017/0364831 A1 | 12/2017 | Ghosh et al. | |
| 2017/0369051 A1 | 12/2017 | Sakai et al. | |
| 2017/0369062 A1 | 12/2017 | Saigusa et al. | |
| 2017/0369067 A1 | 12/2017 | Saigusa et al. | |
| 2017/0371338 A1 | 12/2017 | Kamata et al. | |
| 2018/0004214 A1 | 1/2018 | Wisniowski et al. | |
| 2018/0011494 A1 | 1/2018 | Zhu et al. | |
| 2018/0029500 A1 | 2/2018 | Katanoda | |
| 2018/0032079 A1 | 2/2018 | Nishi | |
| 2018/0046191 A1 | 2/2018 | Keller et al. | |
| 2018/0129206 A1 | 5/2018 | Harada et al. | |
| 2018/0147988 A1 * | 5/2018 | Lee | G01C 21/3697 |
| 2018/0173230 A1 | 6/2018 | Goldman-Shenhar et al. | |
| 2018/0232585 A1 | 8/2018 | Kim | |
| 2018/0276485 A1 | 9/2018 | Heck et al. | |
| 2018/0290657 A1 | 10/2018 | Ryne et al. | |
| 2018/0341880 A1 | 11/2018 | Kislovskiy et al. | |
| 2018/0342033 A1 | 11/2018 | Kislovskiy et al. | |
| 2018/0348786 A1 | 12/2018 | Yasui et al. | |
| 2018/0349785 A1 | 12/2018 | Zheng et al. | |
| 2018/0373245 A1 | 12/2018 | Nishi | |
| 2019/0011918 A1 * | 1/2019 | Son | G01C 21/3617 |
| 2019/0047564 A1 * | 2/2019 | Brady | B60W 30/181 |
| 2019/0047584 A1 | 2/2019 | Donnelly | |
| 2019/0049960 A1 | 2/2019 | Battles et al. | |

(56) References Cited

U.S. PATENT DOCUMENTS

| | | | |
|---|---|---|---|
| 2019/0086549 A1 | 3/2019 | Ushani et al. | |
| 2019/0087307 A1* | 3/2019 | Zhan | G06F 30/15 |
| 2019/0096244 A1 | 3/2019 | Guruva Reddiar et al. | |
| 2019/0101919 A1 | 4/2019 | Kabilarov et al. | |
| 2019/0113918 A1 | 4/2019 | England et al. | |
| 2019/0129436 A1 | 5/2019 | Sun et al. | |
| 2019/0135281 A1 | 5/2019 | Miura et al. | |
| 2019/0193722 A1 | 6/2019 | Yamamuro et al. | |
| 2019/0196471 A1 | 6/2019 | Vaughn et al. | |
| 2019/0202476 A1* | 7/2019 | Tao | B60W 30/095 |
| 2019/0258268 A1 | 8/2019 | Macneille et al. | |
| 2019/0281077 A1* | 9/2019 | Deb | G06F 9/45558 |
| 2019/0295179 A1 | 9/2019 | Shalev-Shwartz et al. | |
| 2019/0299991 A1 | 10/2019 | Horii et al. | |
| 2019/0310632 A1 | 10/2019 | Nakhaei Sarvedani | |
| 2019/0310654 A1* | 10/2019 | Halder | G05D 1/0088 |
| 2019/0317506 A1 | 10/2019 | Ishioka | |
| 2019/0324457 A1 | 10/2019 | Iwamoto et al. | |
| 2019/0329771 A1 | 10/2019 | Wray et al. | |
| 2019/0329782 A1 | 10/2019 | Shalev-Shwartz et al. | |
| 2019/0339088 A1 | 11/2019 | Jeswani et al. | |
| 2019/0359209 A1 | 11/2019 | Mizutani et al. | |
| 2019/0377351 A1 | 12/2019 | Phillips et al. | |
| 2020/0039520 A1 | 2/2020 | Misu et al. | |
| 2020/0079377 A1 | 3/2020 | Yashiro et al. | |
| 2020/0097008 A1 | 3/2020 | Sadat et al. | |
| 2020/0180647 A1 | 6/2020 | Anthony | |
| 2020/0180657 A1 | 6/2020 | Iwamoto et al. | |
| 2020/0225669 A1 | 7/2020 | Silva et al. | |
| 2020/0269871 A1 | 8/2020 | Schmidt et al. | |
| 2020/0269875 A1 | 8/2020 | Wray et al. | |
| 2020/0279488 A1 | 9/2020 | Shibasaki | |
| 2020/0293041 A1 | 9/2020 | Palanisamy | |
| 2020/0356828 A1* | 11/2020 | Palanisamy | G06F 18/25 |
| 2020/0363814 A1 | 11/2020 | He et al. | |
| 2020/0389469 A1* | 12/2020 | Litichever | H04L 63/029 |
| 2020/0406906 A1 | 12/2020 | Omari et al. | |
| 2021/0024092 A1 | 1/2021 | Han et al. | |
| 2021/0089048 A1 | 3/2021 | Tran | |
| 2021/0116915 A1 | 4/2021 | Jiang et al. | |
| 2021/0237759 A1 | 8/2021 | Wray et al. | |
| 2021/0240190 A1 | 8/2021 | Wray et al. | |
| 2021/0279331 A1* | 9/2021 | Gilad | G06F 21/556 |
| 2021/0294323 A1 | 9/2021 | Bentahar et al. | |
| 2021/0374540 A1 | 12/2021 | Yuan et al. | |
| 2022/0118611 A1* | 4/2022 | Geissler | B25J 9/1679 |

FOREIGN PATENT DOCUMENTS

| | | | | |
|---|---|---|---|---|
| CN | 105635849 A | | 6/2016 | |
| CN | 106103232 A | | 11/2016 | |
| CN | 106184223 A | | 12/2016 | |
| CN | 106428000 A | | 2/2017 | |
| CN | 107577227 A | | 1/2018 | |
| DE | 10341753 A1 | | 4/2005 | |
| DE | 102012005245 A1 | | 9/2012 | |
| DE | 102012220134 A1 | | 5/2014 | |
| DE | 102013212255 A1 | | 12/2014 | |
| DE | 102015201272 A1 | | 7/2016 | |
| DE | 102016203086 A1 | | 8/2017 | |
| EP | 2084690 A2 | | 8/2009 | |
| EP | 2902864 A1 | | 8/2015 | |
| EP | 2958783 A1 | | 12/2015 | |
| EP | 3273423 A1 | | 1/2018 | |
| JP | H02-114304 A | | 4/1990 | |
| JP | 2007179388 A | | 7/2007 | |
| JP | 2012-221291 A | | 11/2012 | |
| JP | 2015-140181 A | | 8/2015 | |
| JP | 2015-199439 A | | 11/2015 | |
| JP | 2015191273 A | | 11/2015 | |
| JP | 2016017914 A | | 2/2016 | |
| JP | 2016139163 A | | 8/2016 | |
| JP | 201781426 A | | 5/2017 | |
| JP | 2018-49445 A | | 3/2018 | |
| RU | 2436167 C1 | | 12/2011 | |
| WO | 2008/053373 A2 | | 5/2008 | |
| WO | 2012-172632 A1 | | 12/2012 | |
| WO | 2014/024336 A1 | | 2/2014 | |
| WO | 2014/130178 A1 | | 8/2014 | |
| WO | 2015/052865 A1 | | 4/2015 | |
| WO | 2015112651 A1 | | 7/2015 | |
| WO | 2015/134558 A1 | | 9/2015 | |
| WO | 2016121572 A1 | | 8/2016 | |
| WO | 2016124178 A1 | | 8/2016 | |
| WO | 2016129067 A1 | | 8/2016 | |
| WO | 2016130719 A2 | | 8/2016 | |
| WO | 2017/013746 A1 | | 1/2017 | |
| WO | 2017/013749 A1 | | 1/2017 | |
| WO | 2017010344 A1 | | 1/2017 | |
| WO | 2017/022448 A1 | | 2/2017 | |
| WO | 2017/120336 A2 | | 7/2017 | |
| WO | 2018147871 A1 | | 8/2018 | |
| WO | 2018147872 A1 | | 8/2018 | |
| WO | 2018147873 A1 | | 8/2018 | |
| WO | 2018147874 A1 | | 8/2018 | |
| WO | WO-2020075961 A1 * | | 4/2020 | B60W 30/0956 |

OTHER PUBLICATIONS

Dispatch of Autonomous Vehicles (Year: 2020).*
Opportunities for reinforcement learning in stochastic dynamic vehicle (Year: 2023).*
Reinforcement learning based approach for dynamic vehicle routing (Year: 2023).*
Brechtel et al.; Probabilistic decision-making under uncertainty for autonomous driving using continuous POMDPs; In: 2014 IEEE 17th International Conference on Intelligent Transportation Systems (ITSC); Oct. 11, 2014.
Kala et al.; Motion Planning of Autonomous Vehicles on a Dual Carriageway without Speed Lanes; Electronics; Jan. 13, 2015.
Matthews et al.; Intent Communication between Autonomous Vehicles and Pedestrians; 2015.
Ragi et al.; UAV path planning in a dynamic environment via partially observable Markov decision process; IEEE Transactions on Aerospace and Electronic Systems; Oct. 8, 2013.
Aoki, S. et al., A Merging Protocol for Self-Driving Vehicles, ICCPS, Apr. 2017.
International Application No. PCT/US2017/017493, filed Feb. 10, 2017.
International Application No. PCT/US2017/017502, filed Feb. 10, 2017.
International Application No. PCT/US2017/017516, filed Feb. 10, 2017.
International Application No. PCT/US2017/017527, filed Feb. 10, 2017.
U.S. Appl. No. 15/621,862, filed Jun. 13, 2017.
Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.
Wray et al., Online Decision-Making for Scalable Autonomous Systems; Conference: Twenty-Sixth International Joint Conference on Artificial Intelligence; Conference Paper • Aug. 2017 ; 7 pages https://www.researchgate.net/publication/318830226_Online_Decision-Making_for_Scalable_Autonomous_Systems.
Wray et al., Online Decision-Making for Scalable Autonomous Systems; Power Point Presentation; Aug. 23, 2017.
Miller, Tim, Explanation in Artificial Intelligence: Insights from the Social Sciences; Aug. 15, 2018; 66 pages; arXiv:1706.07269v3 ; https://arxiv.org/abs/1706.07269.
Bouton et al., Scalable Decision Making with Sensor Occlusions for Autonomous Driving; 2018 IEEE International Conference on Robotics and Automation (ICRA), Brisbane, Australia, May 21-25, 2018; 6 pages.
Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

(56) References Cited

OTHER PUBLICATIONS

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.
Extended European Search Report of corresponding application EP 17895657.9; dated Feb. 25, 2020; 9 pages.
Tang et al., Modeling Drivers' Dynamic Decision-Making Behavior During the Phase Transition Period: An Analytical Approach Based on Hidden Markov Model Theory, IEEE Transactions On Intelligent Transportation Systems, vol. 17, No. 1, Jan. 2016. (9 pages).
Dai, P., Mausam, & Weld, D. (2021). Focused Topological Value Iteration. Proceedings of the International Conference on Automated Planning and Scheduling, 19(1), 82-89. https://doi.org/10.1609/icaps.v19i1.18138.

* cited by examiner

SHARED AUTONOMOUS VEHICLE OPERATIONAL MANAGEMENT

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for autonomous vehicle operational management may be advantageous.

SUMMARY

Disclosed herein are aspects, features, elements, implementations, and embodiments of autonomous vehicle operational management.

An aspect of the disclosed embodiments is a method for use in traversing a vehicle transportation network by an autonomous vehicle. Traversing the vehicle transportation network includes identifying a distinct vehicle operational scenario, wherein traversing the vehicle transportation network includes traversing a portion of the vehicle transportation network that includes the distinct vehicle operational scenario. Traversing the vehicle transportation network includes communicating shared scenario-specific operational control management data associated with the distinct vehicle operational scenario with an external shared scenario-specific operational control management system. Traversing the vehicle transportation network includes operating a scenario-specific operational control evaluation module instance, wherein the scenario-specific operational control evaluation module instance includes an instance of a scenario-specific operational control evaluation model of the distinct vehicle operational scenario, and wherein operating the scenario-specific operational control evaluation module instance includes identifying a policy for the scenario-specific operational control evaluation model, receiving a candidate vehicle control action from the policy for the scenario-specific operational control evaluation model, and traversing a portion of the vehicle transportation network based on the candidate vehicle control action.

Another aspect of the disclosed embodiments is an autonomous vehicle including a non-transitory computer readable medium including instructions for traversing a vehicle transportation network, a trajectory controller configured to operate the autonomous vehicle, and a processor configured to execute instructions stored on a non-transitory computer readable medium to identify a distinct vehicle operational scenario, wherein traversing the vehicle transportation network includes traversing a portion of the vehicle transportation network that includes the distinct vehicle operational scenario, communicate shared scenario-specific operational control management data associated with the distinct vehicle operational scenario with an external shared scenario-specific operational control management system, operate a scenario-specific operational control evaluation module instance, wherein the scenario-specific operational control evaluation module instance includes an instance of a scenario-specific operational control evaluation model of the distinct vehicle operational scenario, and wherein operating the scenario-specific operational control evaluation module instance includes identifying a policy for the scenario-specific operational control evaluation model, receive a candidate vehicle control action from the policy for the scenario-specific operational control evaluation model, and output the candidate vehicle control action to the trajectory controller as a vehicle control action such that the trajectory controller controls the autonomous vehicle to traverse a portion of the vehicle transportation network in accordance with the vehicle control action.

Another aspect of the disclosed embodiments is a method for use in traversing a vehicle transportation network by an autonomous vehicle. The method includes identifying a distinct vehicle operational scenario, wherein traversing the vehicle transportation network includes traversing a portion of the vehicle transportation network that includes the distinct vehicle operational scenario. The method includes receiving shared scenario-specific operational control management data associated with the distinct vehicle operational scenario from an external shared scenario-specific operational control management system. The method includes operating a scenario-specific operational control evaluation module instance, wherein the scenario-specific operational control evaluation module instance includes an instance of a scenario-specific operational control evaluation model of the distinct vehicle operational scenario, and wherein operating the scenario-specific operational control evaluation module instance includes identifying a policy for the scenario-specific operational control evaluation model. Identifying the policy for the scenario-specific operational control evaluation model includes, in response to a determination that the shared scenario-specific operational control management data includes operational experience data generated by a second autonomous vehicle in response to traversing a correlated vehicle operational scenario, generating the policy based on the operational experience data. The method includes receiving a candidate vehicle control action from the policy for the scenario-specific operational control evaluation model, and traversing a portion of the vehicle transportation network based on the candidate vehicle control action.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module instances, may identify a vehicle control action from the candidate vehicle control actions, and may control the autonomous vehicle to traverse a portion of the vehicle transportation network according to the identified vehicle control action.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

Figure 1:
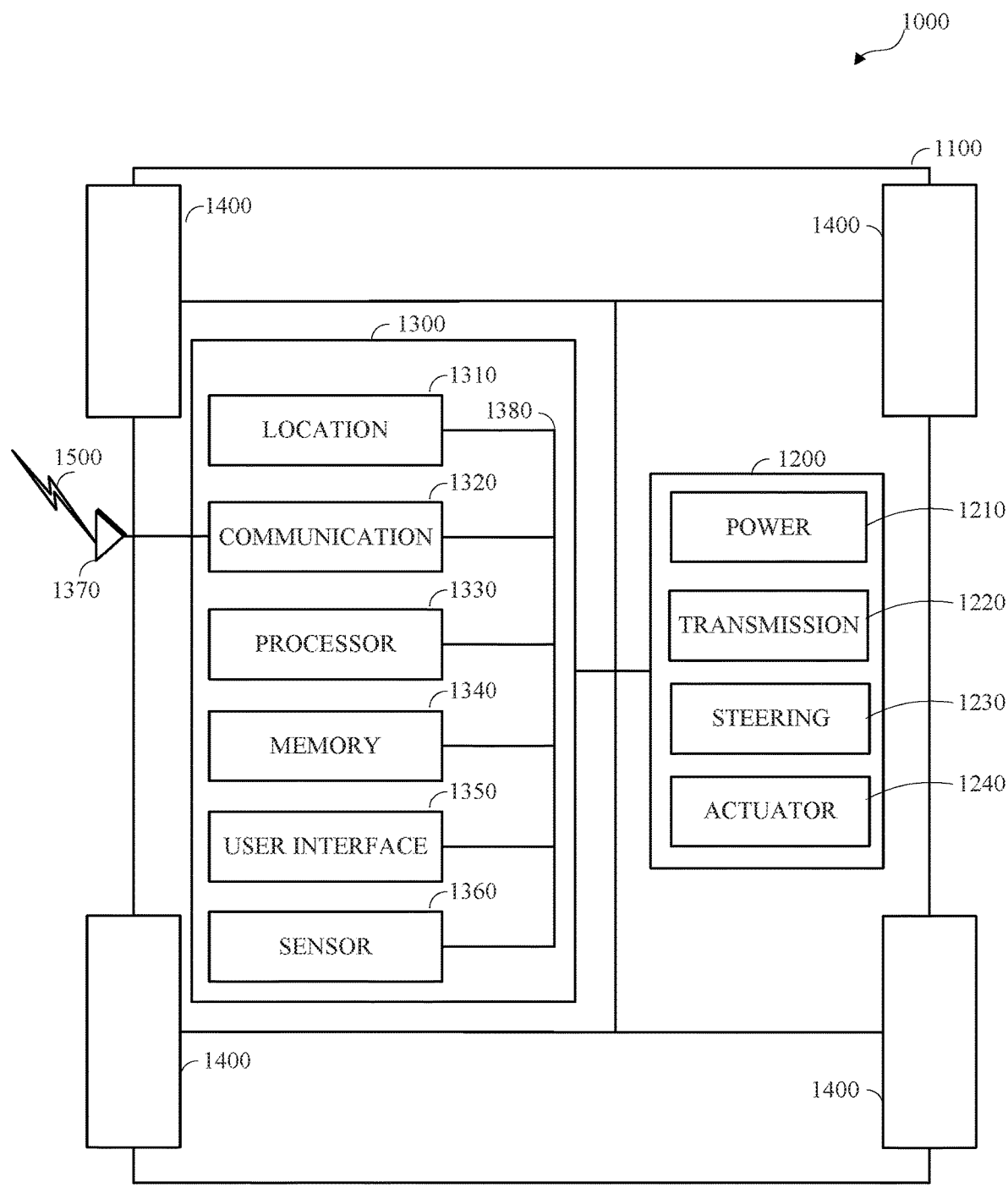
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
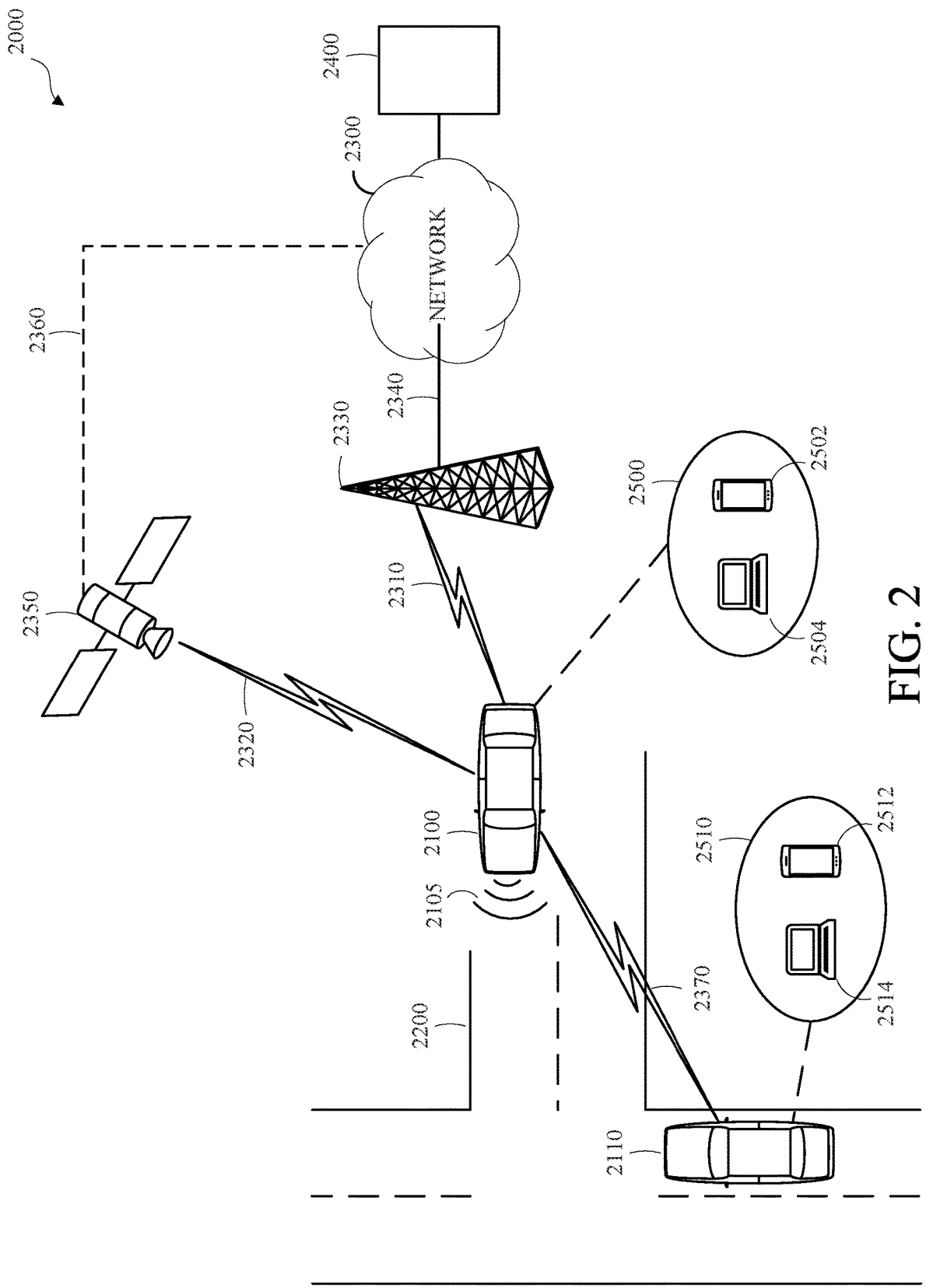
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
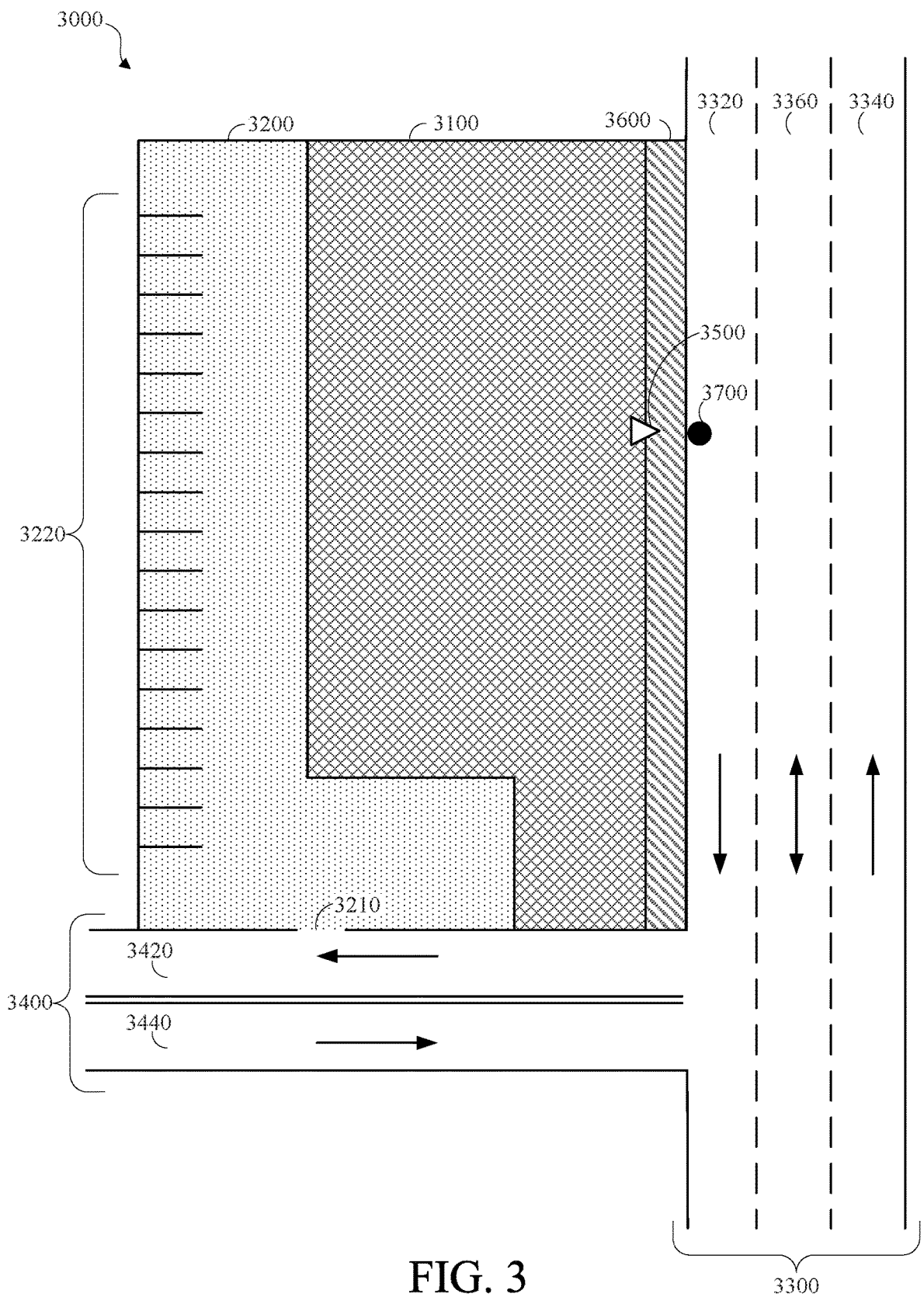
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
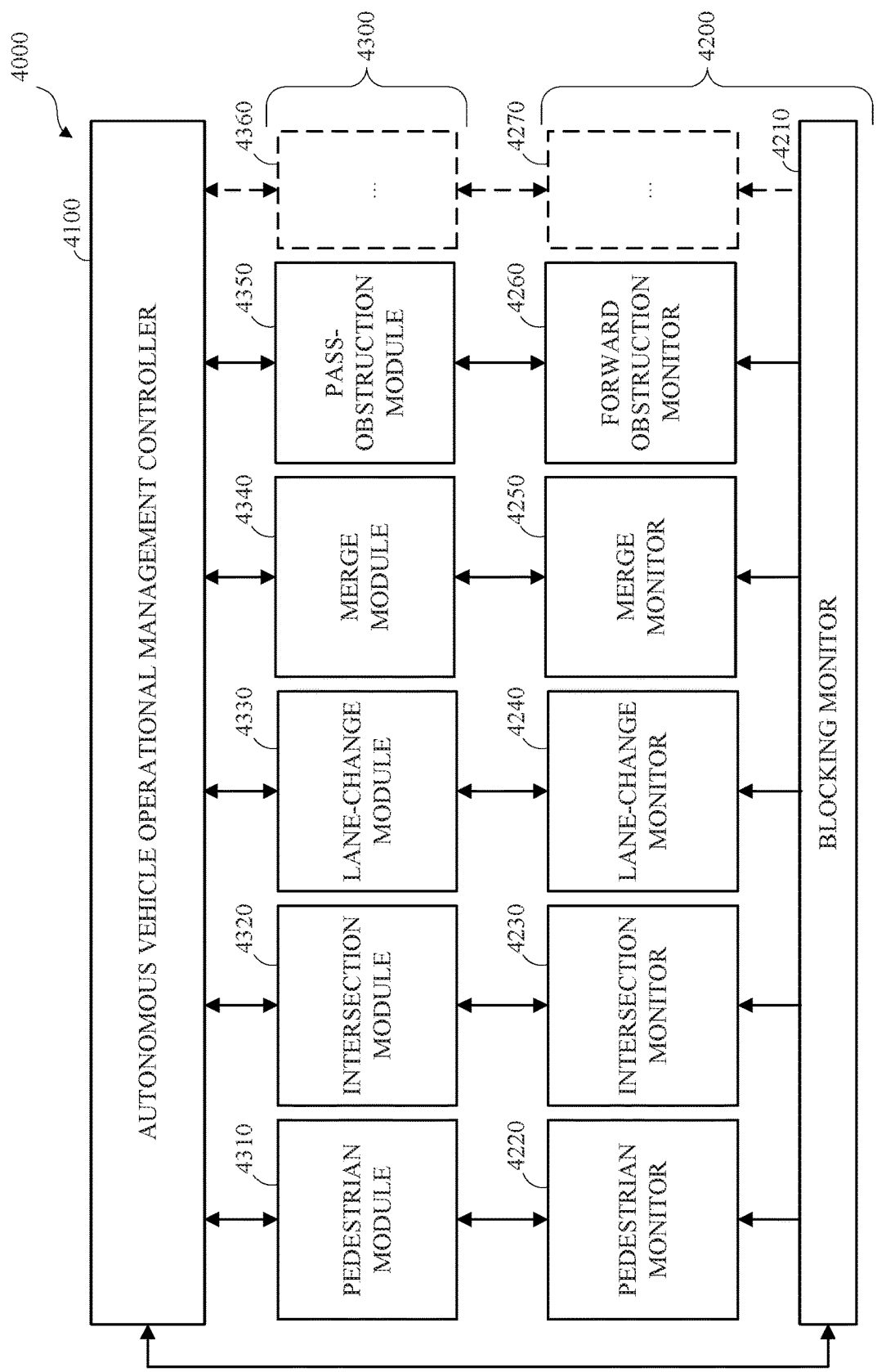
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 4, the autonomous vehicle operational management system 4000 includes an autonomous vehicle operational management controller 4100 (AVOMC), operational environment monitors 4200, and operation control evaluation modules 4300.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof. The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof. The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitor the operational environment of the autonomous vehicle may include using operational environment data received from the operational environment monitors 4200.

The operational environment monitors 4200 may include scenario-agnostic monitors, scenario-specific monitors, or a combination thereof. A scenario-agnostic monitor, such as a blocking monitor 4210, may monitor the operational environment of the autonomous vehicle, generate operational environment data representing aspects of the operational environment of the autonomous vehicle, and output the operational environment data to one or more scenario-specific monitor, the AVOMC 4100, or a combination thereof. A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment information to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the operation control evaluation modules 4300 based on one or more aspects of the operational environment represented by the operational environment data. The operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may send the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model. A POMDP model may model a distinct vehicle operational scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario, and may have a respective defined set of values. Although some examples of state factor values for some state factors are described herein, a state factor, including any state factor described herein, may include any number, or cardinality, of values.

An action from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action, and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations, and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→[0, 1]. A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations (Ω) based on the operational environment of the autonomous vehicle, as represented by the set of states (S), responsive to the actions of the autonomous vehicle, as represented by the set of actions (A), which may be represented as O: A×S×Ω→[0, 1]. A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→□.

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300, and instantiating an instance of the identified model. For example, a SSOCEM 4300 may include a primary model and a secondary model for a respective distinct vehicle operational scenario, and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved, or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of action (A), determining a subsequent, or successor, state from the set of states (S) subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

In some implementations, a model, such as a MDP model or a POMDP model, may reduce the resource utilization associated with solving the corresponding model by evaluating the states, belief states, or both, modeled therein to identify computations corresponding to the respective states, belief states, or both that may be omitted and omitting performing the identified computations, which may include obtaining or maintaining a measure of current quality, such as upper and lower bounds on utility for the respective state, belief state, or both. In some implementations, solving a model may include parallel processing, such as parallel processing using multiple processor cores or using multiple processors, which may include graphics processing units (GPUs). In some implementations, solving a model may include obtaining an approximation of the model, which may improve the efficiency of solving the model.

Figure 5:
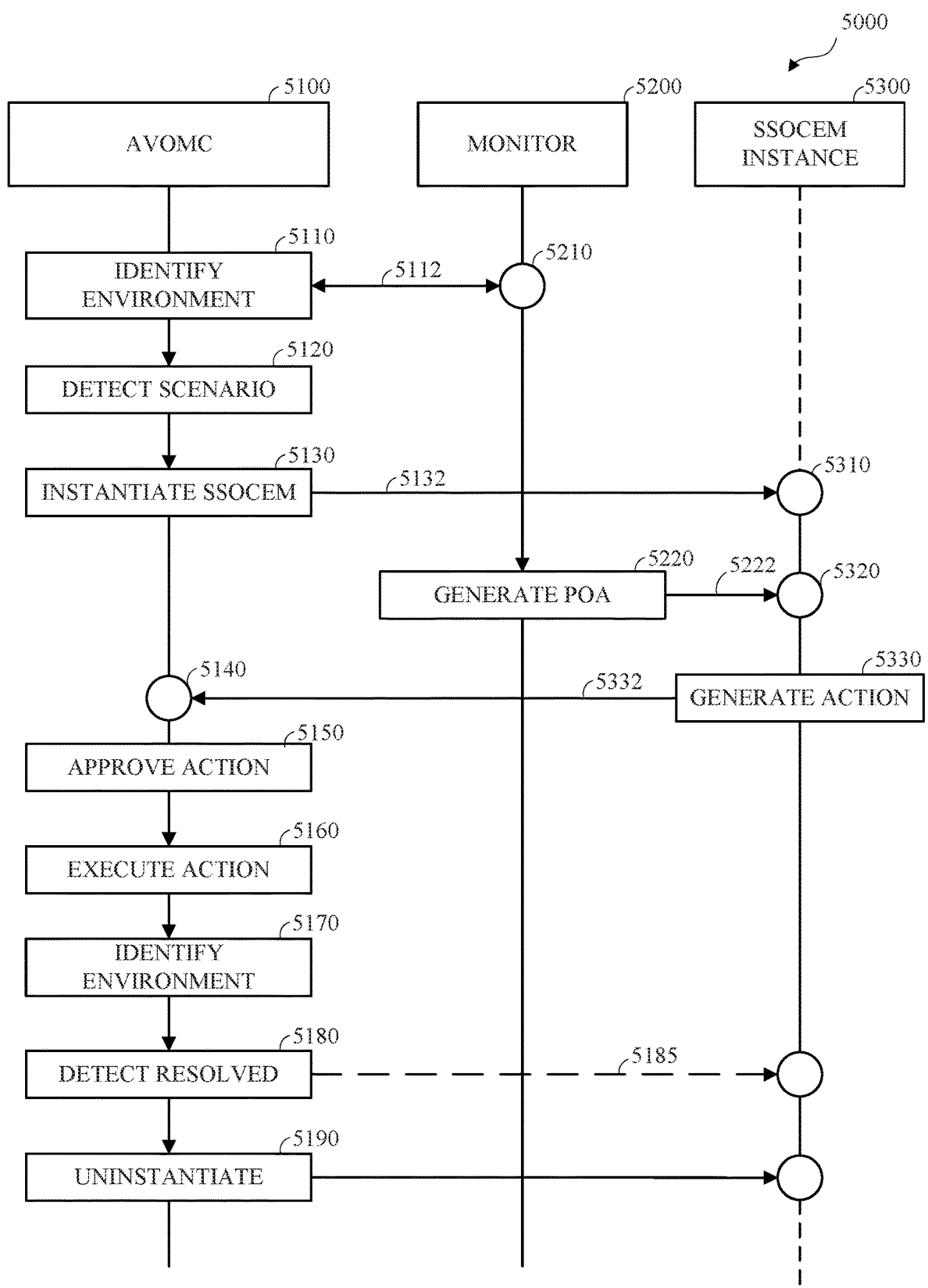
FIG. 5 is a flow diagram of an example of an autonomous vehicle operational management in accordance with embodiments of this disclosure.

FIG. 5 is a flow diagram of an example of autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

As shown in FIG. 5, autonomous vehicle operational management 5000 includes implementing or operating the autonomous vehicle operational management system, including one or more modules or components thereof, which may include operating an autonomous vehicle operational management controller (AVOMC) 5100, such as the AVOMC 4100 shown in FIG. 4; operating operational environment monitors 5200, such as one or more of the operational environment monitors 4300 shown in FIG. 4; and operating a scenario-specific operational control evaluation module instance (SSOCEM instance) 5300, such as an instance of a SSOCEM 4300 shown in FIG. 4.

The AVOMC 5100 may monitor the operational environment of the autonomous vehicle, or defined aspects thereof, at 5110 to identify an operational environment, or an aspect thereof, of the autonomous vehicle. For example, operational environment monitors 5200 may monitor scenario-specific aspects of the operational environment and may send operational environment data representing the operational environment to the AVOMC 5100. Monitoring the operational environment of the autonomous vehicle may include identifying and tracking external objects at 5110, identifying distinct vehicle operational scenarios at 5120, or a combination thereof. For example, the AVOMC 5100, the operational environment monitors 5200, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 1360 shown in FIG. 1 or the on-vehicle sensors 2105 shown in FIG. 2. The sensor, or another unit of the autonomous vehicle, may store the sensor information in a memory, such as the memory 1340 shown in FIG. 1, of the autonomous vehicle and the AVOMC 5100 reading the sensor information from the memory.

Identifying the operational environment data may include identifying information indicating one or more aspects of the operational environment from vehicle transportation network data. For example, the AVOMC 5100 may read, or otherwise receive, vehicle transportation network data indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment data at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 5100 may read, or otherwise receive, vehicle transportation network data representing an identified route, such as a route identified in response to user input, for the autonomous vehicle.

The AVOMC 5100 and the operational environment monitors 5200 may communicate to identify the operational environment information as indicated at 5110, 5112, and 5210. Alternatively, or in addition, the operational environment monitors 5200 may receive the operational environment data from another component of the autonomous vehicle, such as from a sensor of the autonomous vehicle or from another operational environment monitor 5200, or the operational environment monitors 5200 may read the operational environment data from a memory of the autonomous vehicle.

The AVOMC 5100 may detect or identify one or more distinct vehicle operational scenarios at 5120, such as based on one or more aspects of the operational environment represented by the operational environment data identified at 5110.

The AVOMC 5100 may instantiate a SSOCEM instance 5300 based on one or more aspects of the operational environment represented by the operational environment data at 5130, such as in response to identifying a distinct vehicle operational scenario at 5120. Although one SSOCEM instance 5300 is shown in FIG. 5, the AVOMC 5100 may instantiate multiple SSOCEM instances 5300 based on one or more aspects of the operational environment represented by the operational environment data identified at 5110, each SSOCEM instance 5300 corresponding to a respective distinct vehicle operational scenario detected at 5120, or a combination of a distinct external object identified at 5110 and a respective distinct vehicle operational scenario detected at 5120. Instantiating a SSOCEM instance 5300 at 5130 may include sending the operational environment data representing an operational environment for the autonomous vehicle to the SSOCEM instance 5300 as indicated at 5132. The SSOCEM instance 5300 may receive the operational environment data representing an operational environment for the autonomous vehicle, or one or more aspects thereof, at 5310. Instantiating a SSOCEM instance 5300 at 5130 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 5200 may include a blocking monitor, such as the blocking monitor 4210 shown in FIG. 4, which may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may send the probabilities of availability identified at 5220 to the SSOCEM instance 5300 at 5222. Alternatively, or in addition, the blocking monitor may store the probabilities of availability identified at 5220 in a memory of the autonomous vehicle. Although not expressly shown in FIG. 5, the blocking monitor may send the probabilities of availability identified at 5220 to the AVOMC 5100 at 5222 in addition to, or in alternative to, sending the probabilities of availability to the SSOCEM instance 5300. The SSOCEM instance 5300 may receive the probabilities of availability at 5320.

The SSOCEM instance 5300 may generate or identify a candidate vehicle control action at 5330. For example, the SSOCEM instance 5300 may generate or identify the candidate vehicle control action at 5330 in response to receiving the operational environment data 5310, receiving the probability of availability data at 5320, or both. For example, the instance of the solution or policy instantiated at 5310 for the model of the distinct vehicle operational scenario may output the candidate vehicle control action based on the operational environment data, the probability of availability data, or both. The SSOCEM instance 5300 may send the candidate vehicle control action identified at 5330 to the AVOMC 5100 at 5332. Alternatively, or in addition, the SSOCEM instance 5300 may store the candidate vehicle control action identified at 5330 in a memory of the autonomous vehicle.

The AVOMC 5100 may receive a candidate vehicle control action at 5140. For example, the AVOMC 5100 may receive the candidate vehicle control action from the SSOCEM instance 5300 at 5140. Alternatively, or in addition, the AVOMC 5100 may read the candidate vehicle control action from a memory of the autonomous vehicle.

The AVOMC 5100 may approve the candidate vehicle control action, or otherwise identify the candidate vehicle control action as a vehicle control action for controlling the autonomous vehicle to traverse the vehicle transportation network, at 5150. Approving a candidate vehicle control action at 5150 may include determining whether to traverse a portion of the vehicle transportation network in accordance with the candidate vehicle control action.

The AVOMC 5100 may control, or may provide the identified vehicle control action to another vehicle control unit, the autonomous vehicle to traverse the vehicle transportation network, or a portion thereof, at 5160 in accordance with the vehicle control action identified at 5150.

The AVOMC 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment data.

The AVOMC 5100 may determine or detect whether a distinct vehicle operational scenario is resolved or unresolved at 5180. For example, the AVOMC 5100 may receive operation environment information continuously or on a periodic basis, as described above. The AVOMC 5100 may evaluate the operational environment data to determine whether the distinct vehicle operational scenario has resolved.

The AVOMC 5100 may determine that the distinct vehicle operational scenario corresponding to the SSOCEM instance 5300 is unresolved at 5180, the AVOMC 5100 may send the operational environment data identified at 5170 to the SSOCEM instances 5300 as indicated at 5185, and uninstantiating the SSOCEM instance 5300 at 5180 may be omitted or differed.

The AVOMC 5100 may determine that the distinct vehicle operational scenario is resolved at 5180 and may uninstantiate at 5190 the SSOCEM instances 5300 corresponding to the distinct vehicle operational scenario determined to be resolved at 5180. For example, the AVOMC 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEM instance 5300.

Although not expressly shown in FIG. 5, the AVOMC 5100 may continuously or periodically repeat identifying or updating the operational environment data at 5170, determining whether the distinct vehicle operational scenario is resolved at 5180, and, in response to determining that the distinct vehicle operational scenario is unresolved at 5180, sending the operational environment data identified at 5170 to the SSOCEM instances 5300 as indicated at 5185, until determining whether the distinct vehicle operational scenario is resolved at 5180 includes determining that the distinct vehicle operational scenario is resolved.

Figure 6:
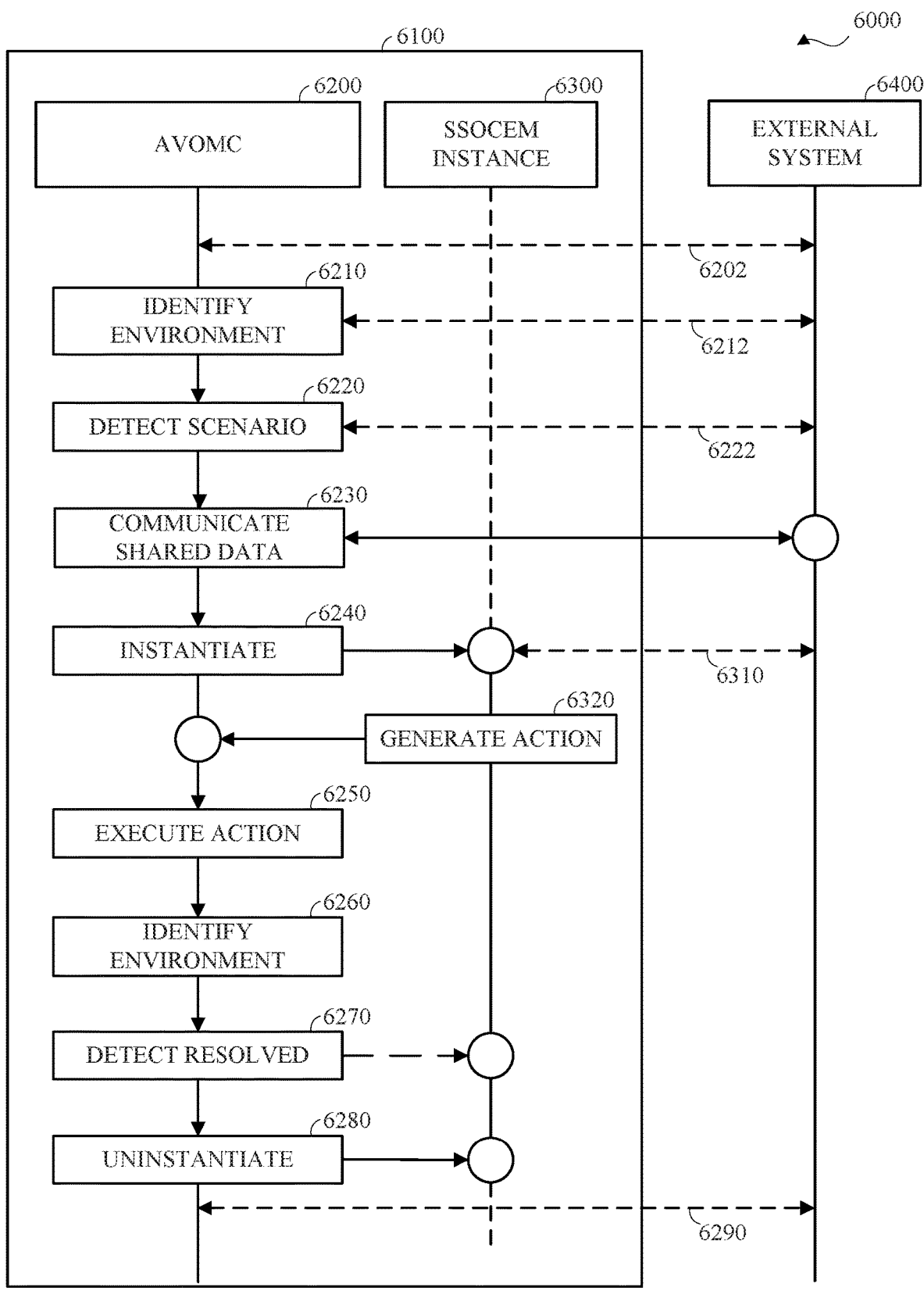
FIG. 6 is a flow diagram of an example of autonomous vehicle operational management with shared scenario-specific operational control management data communication in accordance with embodiments of this disclosure.

FIG. 6 is a flow diagram of an example of autonomous vehicle operational management with shared scenario-specific operational control management data communication 6000 in accordance with embodiments of this disclosure. Autonomous vehicle operational management with shared scenario-specific operational control management data communication 6000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4, which may include implementing autonomous vehicle management with shared scenario-specific operational control management data communication 6000 in accordance with embodiments of this disclosure. Autonomous vehicle operational management with shared scenario-specific operational control management data communication 6000 may be similar to the autonomous vehicle operational management 5000 shown in FIG. 5 except as described herein or otherwise clear from context.

As shown in FIG. 6, autonomous vehicle operational management with shared scenario-specific operational control management data communication 6000 includes an autonomous vehicle implementing or operating the autonomous vehicle operational management system 6100, including one or more modules or components thereof, which may include operating an AVOMC 6200, such as the AVOMC 4100 shown in FIG. 4 or the AVOMC 5100 shown in FIG. 5; operating operational environment monitors (not shown); and operating a SSOCEM instance 6300, such as an instance of a SSOCEM 4300 shown in FIG. 4.

The AVOMC 6200 may communicate shared scenario-specific operational control management data with an external shared scenario-specific operational control management system 6400. Communicating the shared scenario-specific operational control management data with the external shared scenario-specific operational control management system 6400 may include transmitting or sending the shared scenario-specific operational control management data, or a portion thereof, to external shared scenario-specific operational control management system 6400, receiving the shared scenario-specific operational control management data, or a portion thereof, from the external shared scenario-specific operational control management system 6400, or a combination of transmitting or sending respective portions of the shared scenario-specific operational control management data to external shared scenario-specific operational control management system 6400 and receiving respective portions of the shared scenario-specific operational control management data from the external shared scenario-specific operational control management system 6400.

An autonomous vehicle operational management system 6100 may operate in an inactive or stationary mode, such as while parked or while charging. Operating in an inactive mode may include communicating shared scenario-specific operational control management data with the external shared scenario-specific operational control management system 6400 as indicated at 6202.

Communicating shared scenario-specific operational control management data with an external shared scenario-specific operational control management system 6400 in an inactive mode as indicated at 6202 may include the AVOMC 6200 receiving, from the external shared scenario-specific operational control management system 6400, shared scenario-specific operational control management data, which may include solution or policy data, experience data, or both, for one or more distinct vehicle operational scenarios. The AVOMC 6200 may receive the shared scenario-specific operational control management data as a push notification, in accordance with a systems update, in accordance with a vehicle transportation network information update, or the like.

Communicating shared scenario-specific operational control management data with an external shared scenario-specific operational control management system 6400 in an inactive mode as indicated at 6202 may include the AVOMC 6200 receiving, from the external shared scenario-specific operational control management system 6400, a request for shared scenario-specific operational control management data, which may include solution or policy data, experience data, or both, for one or more identified distinct vehicle operational scenarios. The request may include information identifying the distinct vehicle operational scenarios.

Communicating shared scenario-specific operational control management data with an external shared scenario-specific operational control management system 6400 in an inactive mode as indicated at 6202 may include the AVOMC 6200 transmitting or sending, to the external shared scenario-specific operational control management system 6400, shared scenario-specific operational control management data, which may include recently generated, such as not previously sent, solution or policy data, experience data, or both, for one or more distinct vehicle operational scenarios. The AVOMC 6200 may send the shared scenario-specific operational control management data automatically, such as periodically, in response to an event, or both. For example, the AVOMC 6200 may send shared scenario-specific operational control management data for a distinct vehicle operational scenario to the external shared scenario-specific operational control management system 6400 in response to receiving a request for shared scenario-specific operational control management data for the distinct vehicle operational scenario from the external shared scenario-specific operational control management system 6400. In another example, the AVOMC 6200 may send recently generated shared scenario-specific operational control management data to the external shared scenario-specific operational control management system 6400 while charging.

An autonomous vehicle operational management system 6100 may operate in an active mode, such as in response to powering up, starting, or receiving information indicating a current destination, such as in response to user input. Operating in an active mode may include monitoring the operational environment of the autonomous vehicle at 6210, detecting distinct vehicle operational scenarios at 6220, communicate with the external shared scenario-specific operational control management system 6400 at 6230, instantiating a SSOCEM instance 6300 at 6240, traversing the vehicle transportation network at 6250, identify an operational environment of the autonomous vehicle at 6260, determining whether a distinct vehicle operational scenario is resolved at 6270, uninstantiating the SSOCEM instance 6300 at 6280, and communicate with the external shared scenario-specific operational control management system 6400 at 6290.

The AVOMC 6200 may monitor the operational environment of the autonomous vehicle, or defined aspects thereof, at 6210 to identify an operational environment, or an aspect thereof, of the autonomous vehicle. For example, operational environment monitors may monitor scenario-specific aspects of the operational environment and may send operational environment data representing the operational environment to the AVOMC 6200. Identifying the operational environment data may include identifying information indicating one or more aspects of the operational environment from route data representing an identified route for the autonomous vehicle. For example, the AVOMC 6200 may read, or otherwise receive, vehicle transportation network data representing an identified route, such as a route identified in response to user input, for the autonomous vehicle.

In another example, the AVOMC 6200 may receive information indicating a current destination, such as in response to user input, and may send information indicating the current destination to the external shared scenario-specific operational control management system 6400 as indicated at 6212. In some implementations, the AVOMC 6200 may receive information indicating a route from a current location of the autonomous vehicle to the destination from the external shared scenario-specific operational control management system 6400 as indicated at 6212.

In another example, the AVOMC 6200 may receive information indicating a current destination, such as in response to user input, the AVOMC 6200 may determine a route from a current location of the autonomous vehicle to the destination, and may send information indicating the route to the external shared scenario-specific operational control management system 6400 as indicated at 6212.

The AVOMC 6200 may detect or identify one or more distinct vehicle operational scenarios at 6220. For example, the AVOMC 6200 may detect or identify one or more distinct vehicle operational scenarios at 6220 based on one or more aspects of the operational environment represented by the operational environment data identified at 6210. The AVOMC 6200 may send information indicating the distinct vehicle operational scenarios to the external shared scenario-specific operational control management system 6400 as indicated at 6222.

In another example, the AVOMC 6200 may receive information indicating the distinct vehicle operational scenarios from the external shared scenario-specific operational control management system 6400 as indicated at 6222.

Communicating the shared scenario-specific operational control management data with the external shared scenario-specific operational control management system 6400 at 6230 may include transmitting or sending the shared scenario-specific operational control management data, or a portion thereof, such as a shared scenario-specific operational control management planning data portion, to the external shared scenario-specific operational control management system 6400 at 6230.

Sending the shared scenario-specific operational control management planning data portion to the external shared scenario-specific operational control management system 6400 may include sending a shared scenario-specific operational control management planning data request to the external shared scenario-specific operational control management system 6400. The shared scenario-specific operational control management planning data request may indicate a request for shared scenario-specific operational control management planning data, such as policy data, experience data, or a combination thereof, corresponding to one or more of the distinct vehicle operational scenario identified at 6220. The autonomous vehicle operational management system 6100 may send a shared scenario-specific operational control management planning data request at other times, such as shown at 6202 or in response to receiving input, such as user input, initiating the request.

Experience, history, or episode, data may include state data, belief data, action data, observation data, or any combination thereof generated, identified, or determined in accordance with operating the autonomous vehicle. The experience data may include temporal information, such as temporal information identifying the experience data as a temporal sequence.

Communicating the shared scenario-specific operational control management data with the external shared scenario-specific operational control management system 6400 at 6230 may include transmitting or sending a shared scenario-specific operational control management operational data portion to the external shared scenario-specific operational control management system 6400, which may include solution or policy data, experience data, or both, corresponding to the distinct vehicle operational scenario. For example, the autonomous vehicle operational management system 6100 may identify a previously generated solution or policy, previously generated expectance data, or both, corresponding to the distinct vehicle operational scenario identified at 6220, and the autonomous vehicle operational management system 6100 may send a shared scenario-specific operational control management operational data portion including the previously generated data to the external shared scenario-specific operational control management system 6400 at 6230.

The shared scenario-specific operational control management operational data portion may include privacy protected data. For example, the shared scenario-specific operational control management operational data portion may include experience data, such as belief data, action data, vehicle operational scenario type data, and the like, and may omit user or vehicle identification data. In some implementations, geospatial data, temporal data, or both, may be included in the shared scenario-specific operational control management operational data portion.

Communicating the shared scenario-specific operational control management data with the external shared scenario-specific operational control management system 6400 at 6230 may include receiving the shared scenario-specific operational control management data, or a portion thereof, such as a received shared scenario-specific operational control management data portion, from the external shared scenario-specific operational control management system 6400. For example, the autonomous vehicle operational management system 6100 may receive the received shared scenario-specific operational control management data portion as a response to sending a shared scenario-specific operational control management planning data request, or the autonomous vehicle operational management system 6100 may receive the received shared scenario-specific operational control management data portion as a push notification, which may be in accordance with an autonomous vehicle systems update or a vehicle transportation network data distribution.

Communicating the shared scenario-specific operational control management data with the external shared scenario-specific operational control management system 6400 at 6230 may include receiving a received shared scenario-specific operational control management data request portion, from the external shared scenario-specific operational control management system 6400. A received shared scenario-specific operational control management data request may indicate a distinct vehicle operational scenario and a request for solution or policy data, experience data, or both, corresponding to the identified distinct vehicle operational scenario. A received shared scenario-specific operational control management data request may be received in response to transmitting or sending shared scenario-specific operational control management data to the external shared scenario-specific operational control management system 6400 at 6230. Although not expressly shown in FIG. 6, a received shared scenario-specific operational control management data request may be received by the autonomous vehicle operational management system 6100 independent of detecting the defined vehicle operational scenario at 6220.

Receiving the shared scenario-specific operational control management data from the external shared scenario-specific operational control management system 6400 may include determining whether the received shared scenario-specific operational control management data portion includes malicious data. Determining whether the received shared scenario-specific operational control management data portion includes malicious data may include determining a probability that the received shared scenario-specific operational control management data portion includes malicious data, and determining whether the probability that the received shared scenario-specific operational control management data portion includes malicious data exceeds a defined security threshold.

The received shared scenario-specific operational control management data portion may include a solution or policy for the model of the distinct vehicle operational scenario identified at 6220 and determining whether the received shared scenario-specific operational control management data portion includes malicious data may include validating the solution or policy.

Validating the solution or policy may include evaluating data indicated in the solution or policy based on relevant defined metrics. For example, the solution or policy may include utility values associated with respective belief states and validating the solution or policy may include determining whether a utility value is within a relevant defined range, such as greater than or equal to a defined minimum threshold and less than or equal to a defined maximum threshold, for the corresponding belief state. In another example, the solution or policy may include action data, such as an index or unique identifier associated with an available action, and validating the solution or policy may include determining whether the action data is valid. For example, a model may include three available actions, which may respectively have the action index values of 0, 1, and 2, action data from the solution or policy having action index values of 0, 1, or 2, may be identified as valid action data, and action data from the solution or policy having action index values other than 0, 1, or 2, may be identified as invalid. In another example, the solution or policy may include state data, such as an index or unique identifier associated with an available state, and validating the solution or policy may include determining whether the state data is valid, which may be similar to validating the action data. In another example, the solution or policy may include belief state data, such as an index or unique identifier associated with an available belief state, and validating the solution or policy may include determining whether the belief state data is valid, which may be similar to validating the action data. In another example, the solution or policy may include observation data, such as an index or unique identifier associated with an available observation, and validating the solution or policy may include determining whether the observation data is valid, which may be similar to validating the action data.

The solution or policy may include belief data and validating the solution or policy may include validating the belief data. For example, received belief data may validated by determining corresponding calculated belief data based on state transition probabilities and observation probabilities corresponding to the received belief data. Received belief data that differs from the calculated belief data may be identified as invalid or malicious data.

Validating the solution or policy may include determining whether the policy indicates an action, corresponding to a respective belief state, that has a corresponding penalty, or negative reward, that is exceeds a defined threshold. Policies that indicate actions that have penalties that exceed relevant defined thresholds may be identified as invalid or malicious data.

Validating the solution or policy may include evaluating the policy based on one more defined conditions. A defined condition may expressly identify a state, or belief state, and may indicate one or more invalid actions associated with the identified state or belief state. For example, a defined condition may indicate that state data indicates that an obstruction is blocking the path of the autonomous vehicle, and may indicate an accelerate action as an invalid action. A policy that indicates an action identified as an invalid action in a defined condition may be identified as invalid or malicious data.

Validating the solution or policy may include evaluating the policy based on one more spatial constraints. For example, a belief state indicated in a policy may correspond with a first relative spatial location for a vehicle and corresponding operative conditions, such as trajectory and velocity information for the vehicle, and a subsequent belief state indicated in the policy may correspond with a second relative spatial location for the vehicle, and evaluating the policy based on spatial constraints may include determining whether a difference between the first spatial location and the second spatial location exceeds a threshold, such as a maximum motion value, which may be determined based on the corresponding operative conditions and action.

Validating the solution or policy may include identifying differences between the solution or policy and another solution or policy. For example, the autonomous vehicle operational management system 6100 may receive a solution or policy for a POMDP model of the distinct vehicle operational scenario, the autonomous vehicle operational management system 6100 may identify a solution or policy for a MDP model of the distinct vehicle operational scenario, which may include identifying a previously generated solution or policy or generating the solution or policy, and validating the solution or policy for the POMDP model may include determining a ratio of actions (comparative ratio) from the solution or policy for the MDP model to equivalent actions from the solution or policy for the POMDP policy, wherein respective actions are correlated based on correspondence between respective states in the MDP model and collapsed belief states in the POMDP model. A solution or policy that has a comparative ratio within, such as equal to or less than, a defined threshold may be identified as a valid solution or policy and a solution or policy that has a comparative ratio that exceeds, such as is greater than, the defined threshold may be identified as an invalid policy.

Validating the solution or policy may include generating simulated experience data based on the policy and validating the experience data.

The received shared scenario-specific operational control management data portion may include scenario-specific operational control management experience data and determining whether the received shared scenario-specific operational control management data portion includes malicious data may include validating the scenario-specific operational control management experience data.

Validating the scenario-specific operational control management experience data may include temporal validation. Temporal validation may include identifying an operational state and a corresponding temporal location from the scenario-specific operational control management experience data, identifying a vehicle control action associated with transitioning from the identified operational state to a subsequent operational state from the scenario-specific operational control management experience data, identifying a temporal location associated with the subsequent operational state from the scenario-specific operational control management experience data, determining a difference between the first temporal location and the second temporal location, and determining whether the difference between the first temporal location and the second temporal location is within, a defined temporal transition range associated with transitioning from the first operational state to the subsequent operational state in accordance with the identified vehicle control action. A temporal difference that is outside the defined temporal transition range, such as less than a minimum of the defined temporal transition range or greater than a maximum of the defined temporal transition range, may be identified as indicating malicious data. A temporal difference that is within the defined temporal transition range, such greater than or equal to the minimum of the defined temporal transition range and less than or equal to the maximum of the defined temporal transition range, may be identified as indicating the omission or absence of malicious data.

In response to a determination that the received shared scenario-specific operational control management data portion includes malicious data, such as in response to a determination that the probability that the received shared scenario-specific operational control management data portion includes malicious data exceeds the defined security threshold, the AVOMC 6200 may omit using the received shared scenario-specific operational control management data portion. For example, the AVOMC 6200 may store the received shared scenario-specific operational control management data portion along with an indication that the received shared scenario-specific operational control management data portion includes malicious data, or the AVOMC 6200 may delete the received shared scenario-specific operational control management data portion.

The AVOMC 6200 may instantiate a SSOCEM instance 6300 based on one or more aspects of the operational environment represented by the operational environment data at 6240, such as in response to identifying a distinct vehicle operational scenario at 6220.

Instantiating the SSOCEM instance 6300 at 6240 may include identifying a solution or policy for a model of the distinct vehicle operational scenario identified at 6220.

Identifying the solution or policy for the model of the distinct vehicle operational scenario identified at 6220 may include determining whether the received shared scenario-specific operational control management data portion includes a solution or policy corresponding to the model of the distinct vehicle operational scenario identified at 6220. For example, in response to a determination that the probability that the received shared scenario-specific operational control management data portion includes malicious data is within the defined security threshold, identifying the solution for the scenario-specific operational control evaluation model may include determining whether the received shared scenario-specific operational control management data portion includes a solution or policy corresponding to the model of the distinct vehicle operational scenario identified at 6220. A received solution or policy may be identified as corresponding to the model of the distinct vehicle operational scenario identified at 6220 based on a type or categorization for the respective model. For example, the received shared scenario-specific operational control management data portion may include a solution or policy for a POMDP model of a four-way stop intersection scenario, the distinct vehicle operational scenario identified at 6220 may be a four-way stop intersection scenario, and the solution or policy included in the received shared scenario-specific operational control management data portion may be identified as corresponding to the distinct vehicle operational scenario identified at 6220. The solution or policy included in the received shared scenario-specific operational control management data portion may be a solution or policy generated based on a distinct vehicle operational scenario that geospatially, temporally, or both, from the distinct vehicle operational scenario identified at 6220. In some embodiments, other data may be used to correlate the distinct vehicle operational scenario identified at 6220 to a solution or policy indicated in the received shared scenario-specific operational control management data portion, such as geographic data, temporal data, or both.

The received shared scenario-specific operational control management data portion may include a solution or policy corresponding to the model of the distinct vehicle operational scenario identified at 6220, and instantiating the SSOCEM instance 6300 at 6240 may include identifying the solution or policy indicated in the received shared scenario-specific operational control management data portion as the solution or policy for the scenario-specific operational control evaluation model identified at 6220 and instantiating an instance of the solution or policy for the scenario-specific operational control evaluation model identified at 6220.

Identifying the solution or policy for the model of the distinct vehicle operational scenario identified at 6220 may include determining whether the received shared scenario-specific operational control management data portion includes experience data corresponding to the model of the distinct vehicle operational scenario identified at 6220. For example, in response to a determination that the probability that the received shared scenario-specific operational control management data portion includes malicious data is within the defined security threshold, identifying the solution for the scenario-specific operational control evaluation model may include determining whether the received shared scenario-specific operational control management data portion includes experience data corresponding to the model of the distinct vehicle operational scenario identified at 6220.

Instantiating the SSOCEM instance 6300 at 6240 may include generating the solution or policy for the scenario-specific operational control evaluation model identified at 6220. For example, the AVOMC 6200 may identify available resources, such as time, for generating the solution or policy for the scenario-specific operational control evaluation model identified at 6220 and the AVOMC 6200 may instantiate the SSOCEM instance 6300 at 6240 such that instantiating the SSOCEM instance 6300 at 6240 includes generating the solution or policy for the scenario-specific operational control evaluation model identified at 6220.

For example, the received shared scenario-specific operational control management data portion may include experience data corresponding to the model of the distinct vehicle operational scenario identified at 6220, and instantiating the SSOCEM instance 6300 at 6240 may include generating the solution or policy for the scenario-specific operational control evaluation model identified at 6220 using the experience data included in the received shared scenario-specific operational control management data portion, and instantiating an instance of the generated solution or policy for the scenario-specific operational control evaluation model identified at 6220. Generating the solution or policy using the experience data included in the received shared scenario-specific operational control management data portion may include determining that a previously solved, or partially solved, solution or policy is unavailable at the autonomous vehicle. Generating the solution or policy using the experience data included in the received shared scenario-specific operational control management data portion may include determining that a previously solved, or partially solved, solution or policy is available at the autonomous vehicle, and generating the solution or policy using the previously solved, or partially solved, solution or policy and the experience data included in the received shared scenario-specific operational control management data portion. Generating the solution or policy using the experience data included in the received shared scenario-specific operational control management data portion may include identifying previously generated or received experience data available at the autonomous vehicle, and generating the solution or policy using the previously generated or received experience data and the experience data included in the received shared scenario-specific operational control management data portion.

The autonomous vehicle operational management system 6100 may transmit or send, to the external shared scenario-specific operational control management system 6400, shared scenario-specific operational control management data, which may include the recently generated, such as not previously sent, solution or policy data at 6310.

In some implementations, the AVOMC 6200 may instantiate an SSOCEM instance 6300 to generate a corresponding solution or policy, such as in response to receiving a request for, or instruction to generate, the solution or policy from the external shared scenario-specific operational control management system 6400.

In some implementations, the AVOMC 6200 may suspend or uninstantiate the SSOCEM instance 6300 in response to obtaining a solution or policy for the corresponding distinct vehicle operation scenario. For example, the AVOMC 6200 may instantiate an SSOCEM instance 6300 to generate a corresponding solution or policy in response to receiving a request for, or instruction to generate, the solution or policy from the external shared scenario-specific operational control management system 6400 and may suspend or uninstantiate the SSOCEM instance 6300 in response to obtaining a solution or policy for the corresponding distinct vehicle operation scenario. In another example, the AVOMC 6200 may suspend or uninstantiate the SSOCEM instance 6300 in response to a determination that a difference between a current location of the autonomous vehicle and a location associated with the distinct vehicle operational scenario exceeds a defined threshold. The AVOMC 6200 may resume or reinstantiate the SSOCEM instance 6300 in response to a determination that a difference between a current location of the autonomous vehicle and the location associated with the distinct vehicle operational scenario is within the defined threshold.

The SSOCEM instance 6300 may generate or identify a candidate vehicle control action at 6310. The SSOCEM instance 6300 may send the candidate vehicle control action identified at 6310 to the AVOMC 6200.

The AVOMC 6200 may identify the candidate vehicle control action as a vehicle control action for traversing the vehicle transportation network and may control, or may provide the identified vehicle control action to another vehicle control unit of the autonomous vehicle to control, the autonomous vehicle to traverse the vehicle transportation network, or a portion thereof, at 6250 in accordance with the identified vehicle control action. Traverse the vehicle transportation network, or a portion thereof, at 6250 may include generating experience data, such as recent experience data, corresponding to the respective policy of the SSOCEM instance 6300.

The AVOMC 6200 may identify an operational environment, or an aspect thereof, of the autonomous vehicle at 6260. Identifying an operational environment, or an aspect thereof, of the autonomous vehicle at 6260 may be similar to identifying the operational environment of the autonomous vehicle at 6210 and may include updating previously identified operational environment data. The AVOMC 6200 may determine or detect whether a distinct vehicle operational scenario is resolved or unresolved at 6270. For example, the AVOMC 6200 may receive operation environment information continuously or on a periodic basis, as described above. The AVOMC 6200 may evaluate the operational environment data to determine whether the distinct vehicle operational scenario has resolved. The AVOMC 6200 may determine that the distinct vehicle operational scenario corresponding to the SSOCEM instance 6300 is unresolved at 6270, the AVOMC 6200 may send the operational environment data identified at 6260 to the SSOCEM instances 6300 as indicated, and uninstantiating the SSOCEM instance 6300 at 6280 may be omitted or differed. The AVOMC 6200 may determine that the distinct vehicle operational scenario is resolved at 6270 and may uninstantiate at 6280 the SSOCEM instances 6300 corresponding to the distinct vehicle operational scenario determined to be resolved at 6270.

The autonomous vehicle operational management system 6100 may, at 6290, transmit or send, to the external shared scenario-specific operational control management system 6400, shared scenario-specific operational control management data, which may include the recently generated, such as not previously sent, experience data generated at 6250.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
    traversing, by an autonomous vehicle, a vehicle transportation network, wherein traversing the vehicle transportation network includes:
        identifying a distinct vehicle operational scenario, wherein traversing the vehicle transportation network includes traversing a portion of the vehicle transportation network that includes the distinct vehicle operational scenario;
        communicating, via wireless communications, shared scenario-specific operational control management data associated with the distinct vehicle operational scenario with an external shared scenario-specific operational control management system, wherein the external shared scenario-specific operational control management system is configured to communicate, via the wireless communications, the shared scenario-specific operational control management data to a second autonomous vehicle responsive to the second autonomous vehicle detecting a vehicle operational scenario that corresponds with the distinct vehicle operational scenario;
        operating a scenario-specific operational control evaluation module instance using a previously generated policy of a machine learning algorithm,
            wherein the scenario-specific operational control evaluation module instance includes an instance of a scenario-specific operational control evaluation model of the distinct vehicle operational scenario, and
            wherein operating the scenario-specific operational control evaluation module instance using the previously generated policy includes identifying a policy determined by solving the scenario-specific operational control evaluation model by evaluating possible combinations of elements that define the scenario-specific operational control evaluation model;
        receiving, as a candidate vehicle control action, an action from the policy for the scenario-specific operational control evaluation model; and
        traversing a portion of the vehicle transportation network based on the candidate vehicle control action, wherein the shared scenario-specific operational control management data includes the policy.

2. The method of claim 1, wherein communicating the shared scenario-specific operational control management data includes receiving the shared scenario-specific operational control management data from the external shared scenario-specific operational control management system, and wherein:
    in response to a determination that a probability that the shared scenario-specific operational control management data includes malicious data exceeds a defined security threshold, omitting using the shared scenario-specific operational control management data; and
    in response to a determination that the probability that the shared scenario-specific operational control management data includes malicious data is within the defined security threshold, identifying the policy for the scenario-specific operational control evaluation model using the shared scenario-specific operational control management data.

3. The method of claim 2, wherein receiving the shared scenario-specific operational control management data includes:
   identifying experience data from the shared scenario-specific operational control management data;
   identifying a first operational state and a first temporal location from the experience data, wherein the first temporal location corresponds to the first operational state;
   identifying a vehicle control action associated with transitioning from the first operational state to a subsequent operational state from the experience data;
   identifying a second temporal location associated with the subsequent operational state from the experience data;
   in response to a determination that a temporal distance between the first temporal location and the second temporal location is outside a defined temporal transition range associated with transitioning from the first operational state to the subsequent operational state in accordance with the vehicle control action, identifying the probability that the shared scenario-specific operational control management data includes malicious data such that the probability that the shared scenario-specific operational control management data includes malicious data exceeds the defined security threshold; and
   in response to a determination that the temporal distance between the first temporal location and the second temporal location is within the defined temporal transition range associated with transitioning from the first operational state to the subsequent operational state in accordance with identified vehicle control action, identifying the probability that the shared scenario-specific operational control management data includes malicious data such that the probability that the shared scenario-specific operational control management data includes malicious data is within the defined security threshold.

4. The method of claim 2, wherein receiving the shared scenario-specific operational control management data includes:
   identifying policy data from the shared scenario-specific operational control management data;
   in response to a determination that the policy data includes a utility value associated with a respective belief state:
      in response to a determination that the utility value is within a defined range corresponding to the respective belief state, identifying the probability that the shared scenario-specific operational control management data includes malicious data such that the probability that the shared scenario-specific operational control management data includes malicious data is within the defined security threshold; and
      in response to a determination that the utility value is outside the defined range corresponding to the respective belief state, identifying the probability that the shared scenario-specific operational control management data includes malicious data such that the probability that the shared scenario-specific operational control management data includes malicious data exceeds the defined security threshold;
   in response to a determination that the policy data includes action data:
      in response to a determination that the action data has a value from a defined set of action values, identifying the probability that the shared scenario-specific operational control management data includes malicious data such that the probability that the shared scenario-specific operational control management data includes malicious data is within the defined security threshold; and
      in response to a determination that the defined set of action values omits the value from the action data, identifying the probability that the shared scenario-specific operational control management data includes malicious data such that the probability that the shared scenario-specific operational control management data includes malicious data exceeds the defined security threshold;
   in response to a determination that the policy data includes state data:
      in response to a determination that the state data has a value from a defined set of state values, identifying the probability that the shared scenario-specific operational control management data includes malicious data such that the probability that the shared scenario-specific operational control management data includes malicious data is within the defined security threshold; and
      in response to a determination that the defined set of state values omits the value from the state data, identifying the probability that the shared scenario-specific operational control management data includes malicious data such that the probability that the shared scenario-specific operational control management data includes malicious data exceeds the defined security threshold; and
   in response to a determination that the policy data includes observation data:
      in response to a determination that the observation data has a value from a defined set of observation values, identifying the probability that the shared scenario-specific operational control management data includes malicious data such that the probability that the shared scenario-specific operational control management data includes malicious data is within the defined security threshold; and
      in response to a determination that the defined set of observation values omits the value from the observation data, identifying the probability that the shared scenario-specific operational control management data includes malicious data such that the probability that the shared scenario-specific operational control management data includes malicious data exceeds the defined security threshold.

5. The method of claim 2, wherein identifying the policy for the scenario-specific operational control evaluation model using the shared scenario-specific operational control management data includes:
   in response to a determination that the shared scenario-specific operational control management data includes operational experience data generated by a second autonomous vehicle in response to traversing a correlated vehicle operational scenario, identifying the policy for the scenario-specific operational control evaluation model includes generating the policy based on the operational experience data; and
   in response to a determination that the shared scenario-specific operational control management data includes a policy for a correlated vehicle operational scenario, identifying the policy for the scenario-specific operational control evaluation model includes using the policy for the correlated vehicle operational scenario.

6. The method of claim 1, wherein communicating the shared scenario-specific operational control management data includes sending the shared scenario-specific operational control management data to the external shared scenario-specific operational control management system, and wherein sending the shared scenario-specific operational control management data to the external shared scenario-specific operational control management system includes sending privacy protected data and omits sending data other than privacy protected data.

7. The method of claim 1, wherein communicating the shared scenario-specific operational control management data includes:
  sending a first portion of the shared scenario-specific operational control management data to the external shared scenario-specific operational control management system, wherein sending the first portion of the shared scenario-specific operational control management data to the external shared scenario-specific operational control management system includes:
    in response to a determination that a policy for the distinct vehicle operational scenario is unavailable at the autonomous vehicle, sending a shared scenario-specific operational control management data request including vehicle operational scenario data representing the distinct vehicle operational scenario to the external shared scenario-specific operational control management system; and
  receiving a second portion of the shared scenario-specific operational control management data from the external shared scenario-specific operational control management system, wherein receiving the second portion of the shared scenario-specific operational control management data from the external shared scenario-specific operational control management system includes receiving the second portion in response to sending the first portion.

8. An autonomous vehicle comprising:
  a non-transitory computer readable medium including instructions for traversing a vehicle transportation network;
  a trajectory controller configured to operate the autonomous vehicle;
  a wireless communication link; and
  a processor configured to execute the instructions stored on the non-transitory computer readable medium to:
    identify a distinct vehicle operational scenario, wherein traversing the vehicle transportation network includes traversing a portion of the vehicle transportation network that includes the distinct vehicle operational scenario, and wherein to identify the distinct vehicle operational scenario comprises to identify the distinct vehicle operational scenario in accordance with operational environment data representing an operational environment for the autonomous vehicle;
    communicate, using the wireless communication link, shared scenario-specific operational control management data associated with the distinct vehicle operational scenario with an external shared scenario-specific operational control management system;
    operate a scenario-specific operational control evaluation module instance using a previously generated policy of a machine learning algorithm,
      wherein the scenario-specific operational control evaluation module instance includes an instance of a scenario-specific operational control evaluation model of the distinct vehicle operational scenario, and
      wherein operating the scenario-specific operational control evaluation module instance using the previously generated policy includes identifying a policy determined by solving the scenario-specific operational control evaluation model by evaluating possible combinations of elements that define the scenario-specific operational control evaluation model;
    receive, as a candidate vehicle control action, an action from the policy for the scenario-specific operational control evaluation model; and
    output the candidate vehicle control action to the trajectory controller as a vehicle control action such that the trajectory controller controls the autonomous vehicle to traverse a portion of the vehicle transportation network in accordance with the vehicle control action, wherein the shared scenario-specific operational control management data includes the policy.

9. The autonomous vehicle of claim 8, wherein the processor is configured to execute the instructions stored on the non-transitory computer readable medium to:
  communicate the shared scenario-specific operational control management data by receiving the shared scenario-specific operational control management data from the external shared scenario-specific operational control management system;
  in response to a determination that a probability that the shared scenario-specific operational control management data includes malicious data exceeds a defined security threshold, omit using the shared scenario-specific operational control management data; and
  in response to a determination that the probability that the shared scenario-specific operational control management data includes malicious data is within the defined security threshold, identify the policy for the scenario-specific operational control evaluation model using the shared scenario-specific operational control management data.

10. The autonomous vehicle of claim 9, wherein the processor is configured to execute the instructions stored on the non-transitory computer readable medium to receive the shared scenario-specific operational control management data by:
  identifying experience data from the shared scenario-specific operational control management data;
  identifying a first operational state and a first temporal location from the experience data, wherein the first temporal location corresponds to the first operational state;
  identifying a vehicle control action associated with transitioning from the first operational state to a subsequent operational state from the experience data;
  identifying a second temporal location associated with the subsequent operational state from the experience data;
  in response to a determination that a temporal distance between the first temporal location and the second temporal location is outside a defined temporal transition range associated with transitioning from the first operational state to the subsequent operational state in accordance with the vehicle control action, identifying the probability that the shared scenario-specific operational control management data includes malicious data such that the probability that the shared scenario-specific operational control management data includes malicious data exceeds the defined security threshold; and in response to a determination that the temporal distance between the first temporal location and the second temporal location is within the defined temporal transition range associated with transitioning from the first operational state to the subsequent operational state in accordance with identified vehicle control action, identifying the probability that the shared scenario-specific operational control management data includes malicious data such that the probability that the shared scenario-specific operational control management data includes malicious data is within the defined security threshold.

11. The autonomous vehicle of claim 9, wherein the processor is configured to execute the instructions stored on the non-transitory computer readable medium to receive the shared scenario-specific operational control management data by:

identifying policy data from the shared scenario-specific operational control management data;

in response to a determination that the policy data includes a utility value associated with a respective belief state:
in response to a determination that the utility value is within a defined range corresponding to the respective belief state, identifying the probability that the shared scenario-specific operational control management data includes malicious data such that the probability that the shared scenario-specific operational control management data includes malicious data is within the defined security threshold; and
in response to a determination that the utility value is outside the defined range corresponding to the respective belief state, identifying the probability that the shared scenario-specific operational control management data includes malicious data such that the probability that the shared scenario-specific operational control management data includes malicious data exceeds the defined security threshold;

in response to a determination that the policy data includes action data:
in response to a determination that the action data has a value from a defined set of action values, identifying the probability that the shared scenario-specific operational control management data includes malicious data such that the probability that the shared scenario-specific operational control management data includes malicious data is within the defined security threshold; and
in response to a determination that the defined set of action values omits the value from the action data, identifying the probability that the shared scenario-specific operational control management data includes malicious data such that the probability that the shared scenario-specific operational control management data includes malicious data exceeds the defined security threshold;

in response to a determination that the policy data includes state data:
in response to a determination that the state data has a value from a defined set of state values, identifying the probability that the shared scenario-specific operational control management data includes malicious data such that the probability that the shared scenario-specific operational control management data includes malicious data is within the defined security threshold; and
in response to a determination that the defined set of state values omits the value from the state data, identifying the probability that the shared scenario-specific operational control management data includes malicious data such that the probability that the shared scenario-specific operational control management data includes malicious data exceeds the defined security threshold; and in response to a determination that the policy data includes observation data:
in response to a determination that the observation data has a value from a defined set of observation values, identifying the probability that the shared scenario-specific operational control management data includes malicious data such that the probability that the shared scenario-specific operational control management data includes malicious data is within the defined security threshold; and
in response to a determination that the defined set of observation values omits the value from the observation data, identifying the probability that the shared scenario-specific operational control management data includes malicious data such that the probability that the shared scenario-specific operational control management data includes malicious data exceeds the defined security threshold.

12. The autonomous vehicle of claim 9, wherein the processor is configured to execute the instructions stored on the non-transitory computer readable medium to identify the policy for the scenario-specific operational control evaluation model using the shared scenario-specific operational control management data by:

in response to a determination that the shared scenario-specific operational control management data includes operational experience data generated by a second autonomous vehicle in response to traversing a correlated vehicle operational scenario, identifying the policy for the scenario-specific operational control evaluation model includes generating the policy based on the operational experience data; and in response to a determination that the shared scenario-specific operational control management data includes a policy for a correlated vehicle operational scenario, identifying the policy for the scenario-specific operational control evaluation model includes using the policy for the correlated vehicle operational scenario.

13. The autonomous vehicle of claim 8, wherein the processor is configured to execute the instructions stored on the non-transitory computer readable medium to communicate the shared scenario-specific operational control management data by sending the shared scenario-specific operational control management data to the external shared scenario-specific operational control management system, and wherein sending the shared scenario-specific operational control management data to the external shared scenario-specific operational control management system includes sending privacy protected data and omits sending data other than privacy protected data.

14. The autonomous vehicle of claim 8, wherein the processor is configured to execute the instructions stored on the non-transitory computer readable medium to communicate the shared scenario-specific operational control management data by:

sending a first portion of the shared scenario-specific operational control management data to the external shared scenario-specific operational control management system, wherein sending the first portion of the shared scenario-specific operational control management data to the external shared scenario-specific operational control management system includes:
in response to a determination that a policy for the distinct vehicle operational scenario is unavailable at the autonomous vehicle, sending a shared scenario-specific operational control management data request including vehicle operational scenario data representing the distinct vehicle operational scenario to the external shared scenario-specific operational control management system; and
receiving a second portion of the shared scenario-specific operational control management data from the external shared scenario-specific operational control management system, wherein receiving the second portion of the shared scenario-specific operational control management data from the external shared scenario-specific operational control management system includes receiving the second portion in response to sending the first portion.

15. A method for use in traversing a vehicle transportation network, the method comprising:
traversing, by an autonomous vehicle, a vehicle transportation network, wherein traversing the vehicle transportation network includes:
identifying a distinct vehicle operational scenario, wherein traversing the vehicle transportation network includes traversing a portion of the vehicle transportation network that includes the distinct vehicle operational scenario;
receiving, using wireless communications, shared scenario-specific operational control management data associated with the distinct vehicle operational scenario from an external shared scenario-specific operational control management system;
operating a scenario-specific operational control evaluation module instance using a previously generated policy of a machine learning algorithm and operational experience data, wherein:
the scenario-specific operational control evaluation module instance includes an instance of a scenario-specific operational control evaluation model of the distinct vehicle operational scenario,
operating the scenario-specific operational control evaluation module instance using the previously generated policy and the operational experience data includes identifying a policy determined by solving the scenario-specific operational control evaluation model by evaluating possible combinations of elements that define the scenario-specific operational control evaluation model, wherein:
the shared scenario-specific operational control management data includes the operational experience data,
the operational experience data is generated by a second autonomous vehicle in response to traversing a correlated vehicle operational scenario,
the operational experience data is transmitted, via the wireless communications, from the second autonomous vehicle to the external shared scenario-specific operational control management system, and
identifying the policy for the scenario-specific operational control evaluation model includes solving the scenario-specific operational control evaluation model using the operational experience data;
receiving, as a candidate vehicle control action, an action from the policy for the scenario-specific operational control evaluation model; and
traversing a portion of the vehicle transportation network based on the candidate vehicle control action.

\* \* \* \* \*